(12) United States Patent
Hsu et al.

(10) Patent No.: US 8,421,785 B2
(45) Date of Patent: Apr. 16, 2013

(54) ELECTRICAL DEVICE CAPABLE OF ADJUSTING DISPLAY IMAGE BASED ON A ROTATION OF A WEB CAMERA AND METHOD THEREOF

(75) Inventors: Yu-jen Hsu, Taipei (TW); Nei-chiung Perng, Taipei (TW)

(73) Assignee: Genesys Logic, Inc., Shindian (TW)

( * ) Notice: Subject to any disclaimer, the term of this patent is extended or adjusted under 35 U.S.C. 154(b) by 600 days.

(21) Appl. No.: 12/407,594

(22) Filed: Mar. 19, 2009

(65) Prior Publication Data

US 2010/0045641 A1 Feb. 25, 2010

(30) Foreign Application Priority Data

Aug. 22, 2008 (TW) .............................. 97132288 A

(51) Int. Cl.
*G06F 3/038* (2006.01)
*G09G 5/00* (2006.01)
(52) U.S. Cl.
USPC ........................................................ 345/207
(58) Field of Classification Search .................. 360/207, 360/690, 660; 348/374, 135; 340/521; 396/77
See application file for complete search history.

(56) References Cited

U.S. PATENT DOCUMENTS

| | | | | |
|---|---|---|---|---|
| 7,631,256 | B2 * | 12/2009 | Ishiyama et al. | 715/234 |
| 7,903,171 | B2 * | 3/2011 | Takabatake et al. | 348/376 |
| 2004/0240869 | A1 * | 12/2004 | Jeon | 396/77 |
| 2004/0246272 | A1 * | 12/2004 | Ramian | 345/660 |
| 2006/0022816 | A1 * | 2/2006 | Yukawa | 340/521 |
| 2008/0013262 | A1 | 1/2008 | Stanford et al. | |
| 2009/0060316 | A1 * | 3/2009 | Ruuska | 382/141 |
| 2009/0225219 | A1 * | 9/2009 | Abe | 348/374 |
| 2009/0231440 | A1 * | 9/2009 | Lai et al. | 348/207.1 |
| 2009/0237423 | A1 * | 9/2009 | Shih et al. | 345/690 |

FOREIGN PATENT DOCUMENTS

| | | |
|---|---|---|
| TW | 200812364 A | 3/2008 |
| TW | 200823720 A | 6/2008 |

* cited by examiner

*Primary Examiner* — Fred Tzeng
(74) *Attorney, Agent, or Firm* — Kirton McConkie; Evan R. Witt

(57) ABSTRACT

An electrical device having a display screen to adjust displaying image based on a rotation of a web camera. The web camera is rotatably installed on one side of the frame surrounding the display screen. The web camera captures an image data in a first direction or a second direction. An image sensor generates a plurality of brightness signals based on the image data. A processing unit is used for determining the display to show the image data in a first mode or a second mode based on the plurality of brightness signals.

15 Claims, 4 Drawing Sheets

ELECTRICAL DEVICE CAPABLE OF ADJUSTING DISPLAY IMAGE BASED ON A ROTATION OF A WEB CAMERA AND METHOD THEREOF

BACKGROUND OF THE INVENTION

1. Field of the Invention

The present invention relates to an electrical device capable of adjusting a display image and method thereof, and more specifically, to an electrical device capable of adjusting a display image based on ambient illumination detected by a web camera and method for the same.

2. Description of Prior Art

Web Camera (Web Cam) has such advantages as low cost, simple use and rapid transmission and therefore it is widely used in a video conference system, a web video phone, a surveillance system and an instant messaging program. As a result, more and more electrical devices are equipped with a web camera. Take a laptop with web camera for example, when an image is sensed by an image sensor within the web camera which is disposed on the top of a display panel, the image sensor immediately outputs an analog sensor data. The analog sensor data is transformed to a digital image data, named as an original image data, by a control chip. After then, the original data is processed by a processing unit and displayed on the display screen.

Besides, in order to share pictures with other participants, the web camera turns its shot upside down by 180 degree, from the direction facing toward the user to the opposite direction. However, the display image shown on the display screen also turns upside down. To solve the problem of the reversed image, in the prior art, whether to adjust the display image or not is determined by whether the tenon of web camera is locked or not. Nevertheless, tenons are account for some cost. It is therefore the goal of the industry to find out a method of adjusting the display image to the direction of the web camera's shot, without any additional cost.

SUMMARY OF THE INVENTION

It is therefore a primary objective of this invention to provide an electrical device capable of adjusting a display image based on ambient illumination detected by a web camera and method for the same.

Briefly summarized, an electrical device of adjusting a display image based on ambient illumination detected by a web camera comprises a display screen surrounded by a frame for showing an image, a web camera rotatably installed on one side of the frame for capturing an image data in a first direction or a second direction, an image sensor coupled to the web camera, for generating a plurality of brightness signals based on the image data, and a processing unit coupled to the image sensor for determining the display screen to show the image data in a first mode or a second mode based on the plurality of brightness signals.

According to the present invention, the processing unit determines the display screen to show the image data in the first mode when the web camera is facing to the first direction. The processing unit determines the display screen to show the image data in the second mode when the web camera is facing to the second direction.

According to the present invention, the electrical device is a notebook computer.

According to the present invention, the processing unit is used for determining the display screen to show the image data in the first mode or the second mode based on a number of brightness signals in excess of a predetermined value.

In another aspect, the present invention provides a method of adjusting a display image of an electrical device. The method comprises the steps of: providing a web camera rotatably installed on one side of a frame which is used for surrounding the display screen; capturing an image data when the web camera is facing to in a first direction or a second direction; generating a plurality of brightness signals based on the image data; and determining the display screen to show the image data in a first mode or a second mode based on the plurality of brightness signals.

These and other objectives of the present invention will become apparent to those of ordinary skill in the art after reading the following detailed description of the preferred embodiment that is illustrated in the various figures and drawings.

DETAILED DESCRIPTION OF THE PREFERRED EMBODIMENTS

Figure 1:
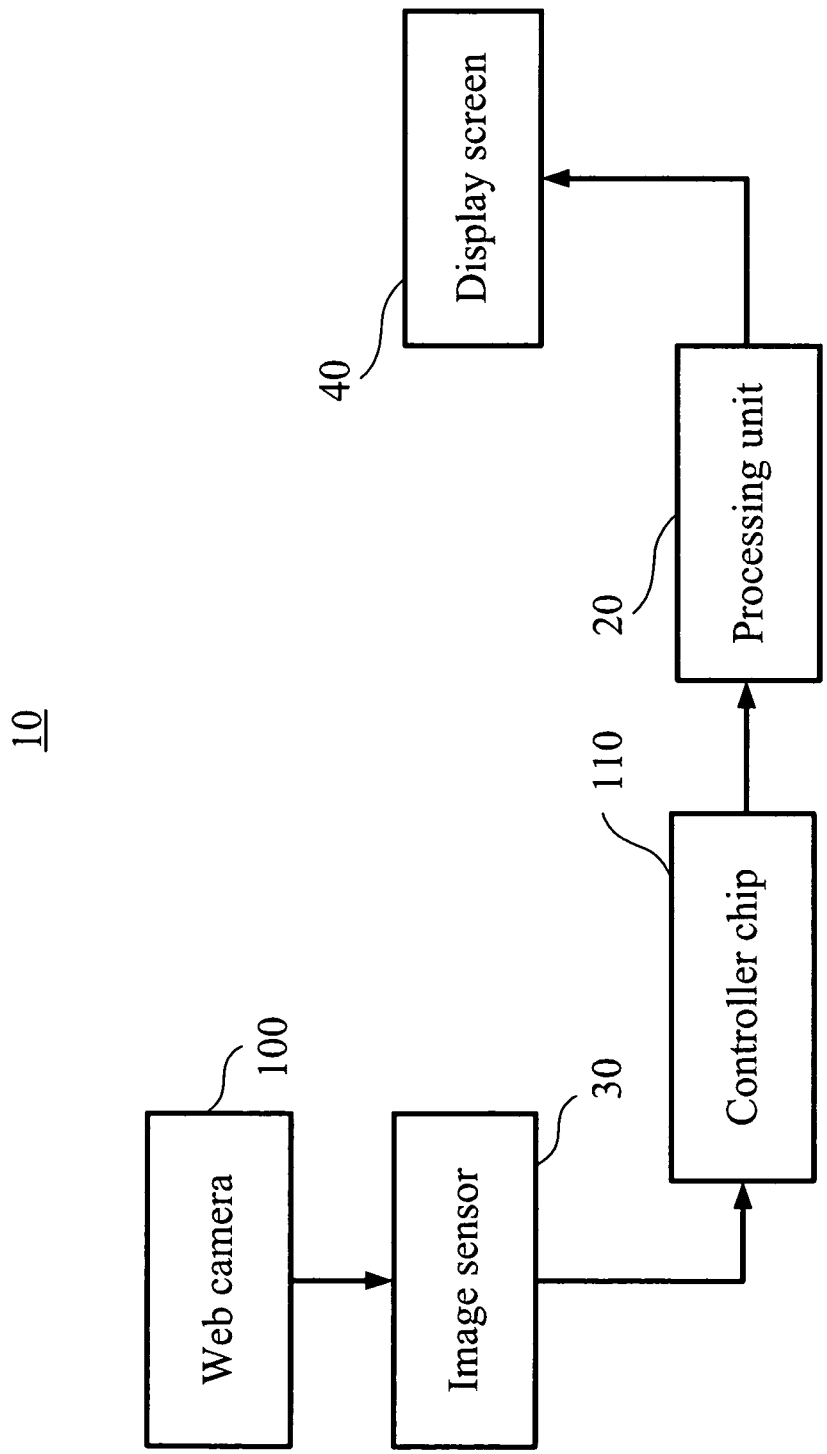
FIG. 1 shows a functional block diagram of an electrical device capable of adjusting a display image according to a preferred embodiment of the present invention.

Please refer to FIG. 1 showing a functional block diagram of an electrical device 10 capable of adjusting a display image according to a preferred embodiment of the present invention. The electrical device 10 comprises a web camera 100, a processing unit 20, an image sensor 30, and a display screen 40 surrounded by a frame 106. The web camera 100 is rotatably disposed on any one side of the frame 106. Preferably, the web camera 100 is disposed on the top side of the frame 106. Preferably, the electrical device 10 is a notebook computer.

Figure 2A:
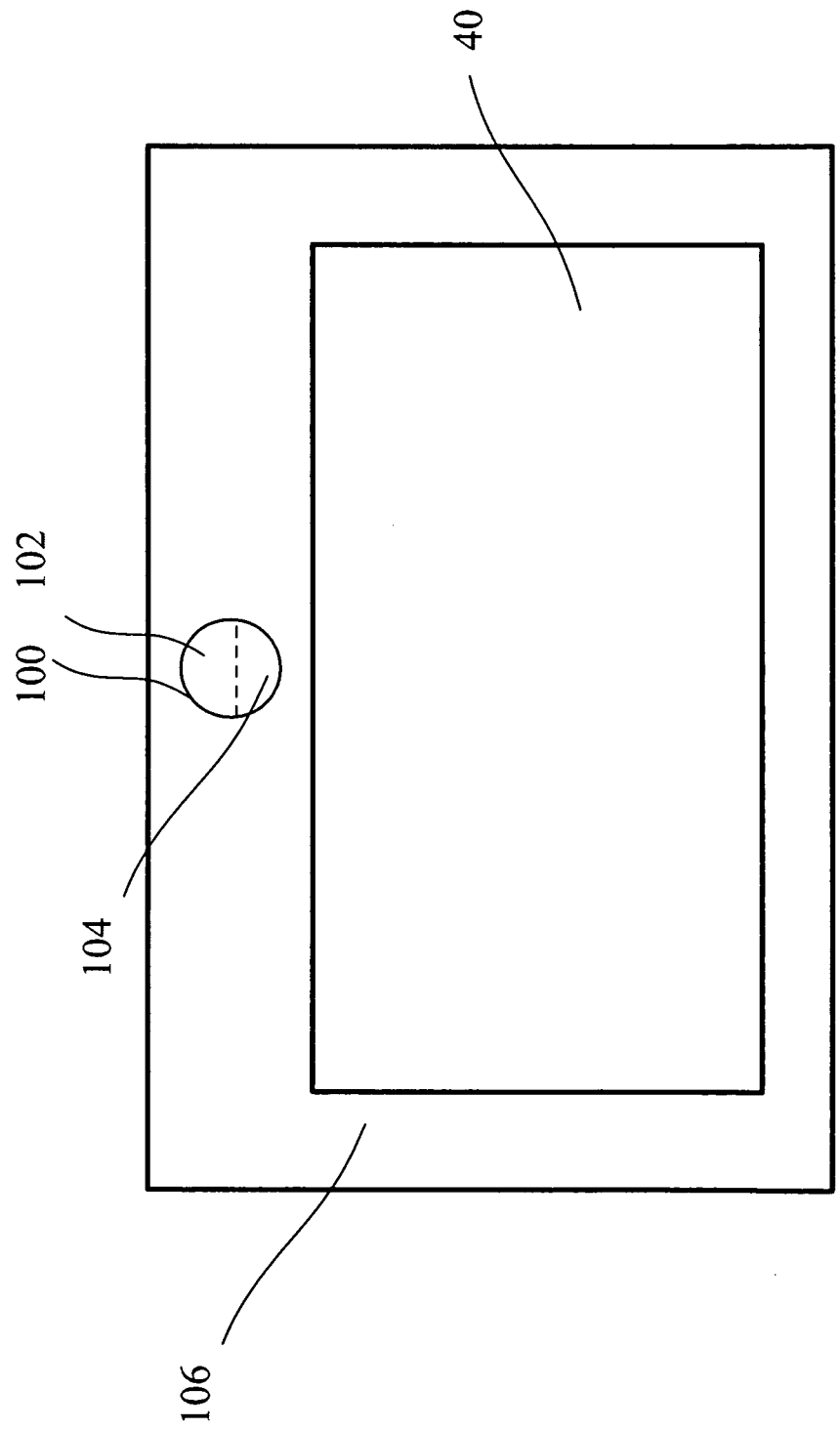
FIG. 2A and FIG. 2B are diagrams showing the web camera facing in a first direction and a second direction, respectively.
Figure 2B:
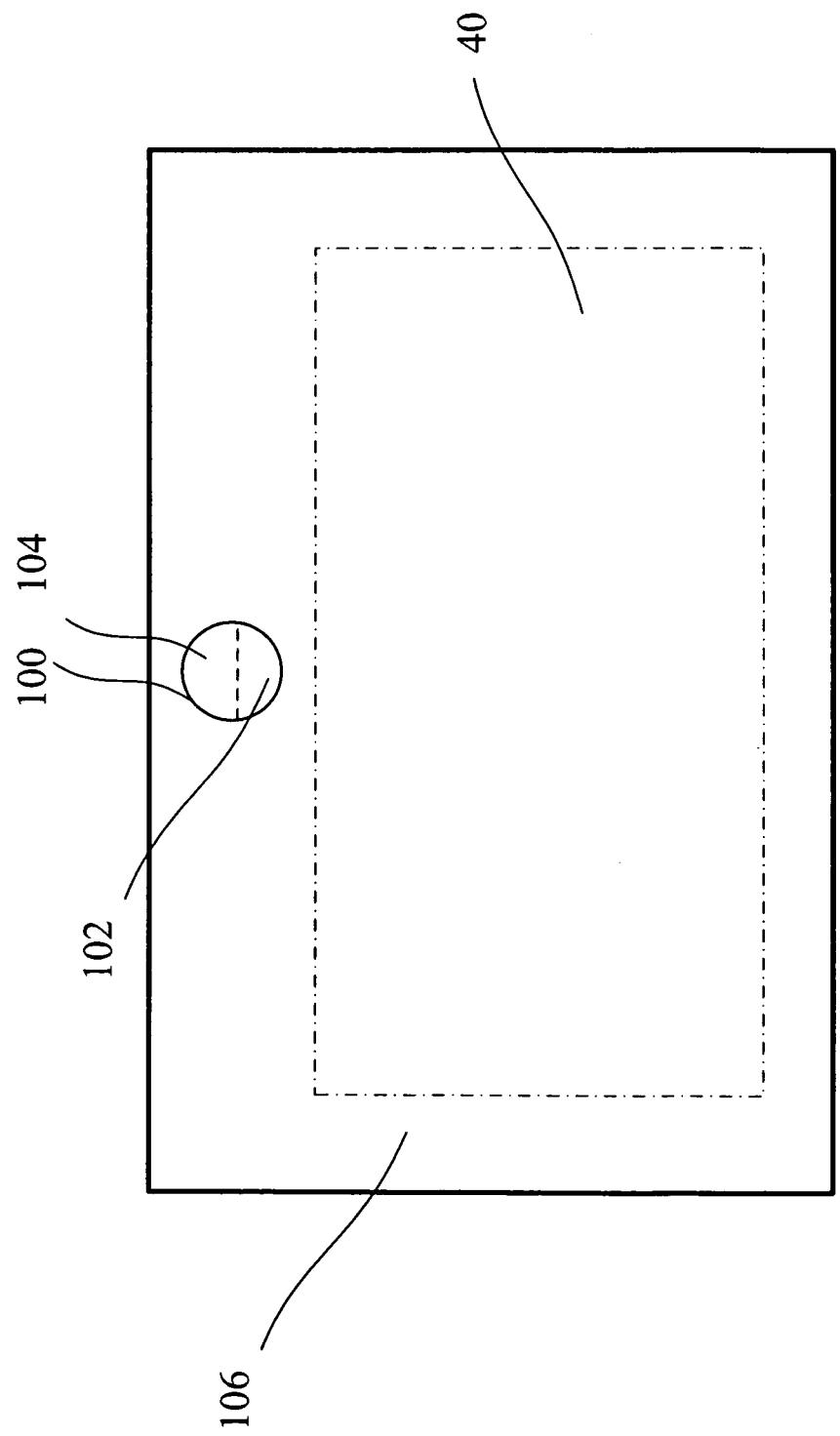

Please refer to FIG. 1, FIG. 2A and FIG. 2B. FIG. 2A and FIG. 2B are diagrams showing the web camera 100 facing in a first direction and a second direction, respectively. The moment the image sensor 30 facing in the first direction senses image data, it outputs a plurality of analog sensed image data to a controller chip 110. The plurality of analog sensed image data can be regarded as a display matrix. The controller chip 110 compares the plurality of analog sensed image data with a predetermined brightness. If the brightness indicated by the analog sensor data exceeds the predetermined brightness, then the controller chip 110 outputs a digital brightness signal of logic value "1"; on the contrary, if the brightness indicated by the analog sensor data is smaller than the predetermined brightness, then the controller chip 110 outputs a digital brightness signal of logic value "0". Finally, the plurality of brightness signals are transmitted to the processing unit 20. The plurality of brightness signals comprises a first group of brightness signals and a second group of brightness signals. The first group of brightness signals corresponds to the image data acquired by a top part 102 of the web camera 100, and the second group of brightness signals corresponds to the image data acquired by a bottom part 104 of the web camera 100. According to the plurality of digital brightness signals, the processing unit 20 determines brightness distribution of the image data acquired by the web camera 100 when its shot heads towards the first direction, in which the web camera's shot faces the user watching the display screen 40.

Generally speaking, when the web camera 100 faces the user, the light source is covered by the user. As a result, the brightness of the image data acquired by a top part 102 of the web camera 100 is brighter, while that acquired by a bottom part 104 of the web camera 100 is darker. A number of the first group of brightness signals is more than that of the second group of brightness signals, accordingly. As a consequence, the processing unit 20 determines the web camera 100 is heading toward the first direction, and therefore keeps the display screen 40 display image data in a normal mode (i.e. a first mode).

When the web camera 100 turns upside down by 180 degree so that the shot of the web camera 100 heads toward the opposite direction, the top part 102 and the bottom part 104 of the web camera 100, compared to FIG. 2A, are in an upside-down rotation. Consequently, the brightness of the image data acquired by the top part 102 of the web camera 100 is darker, while that acquired by the bottom part 104 of the web camera 100 is brighter. The display screen shows the image data in the second mode, when a number of the first group of brightness signals is less than that of the second group of brightness signals, accordingly. As a result, the processing unit 20 determines the web camera 100 is heading toward a second direction in which the web camera's shot is facing to a direction opposition to the user watching the display screen 40. In this way, the processing unit 20 controls the display screen 40 to display image data in an inverse mode, i.e. the second mode, which displays the image data in an upside-down rotation. Accordingly, no matter the web camera 100 is heading in the first direction or the second direction, the user can see the correct image, not inverted one, on the display screen.

It is appreciated that the processing unit 20 may be a software program code.

In another embodiment, the processing unit can determine the display to show the image data in a first mode or a second mode based on a number of digital brightness signals. For example, if the number of digital brightness signals of logical value "1" is in excess of a predetermined value, the processing unit 20 determines the web camera 100 is heading toward a first direction, and thus controls the display screen 40 to display image data in a normal mode (i.e. a first mode). On the contrary, if the number of digital brightness signals of logical value "0" is in excess of a predetermined value, the processing unit 20 determines the web camera 100 is heading toward a second direction, and thus controls the display screen 40 to display the image data in the second mode.

Figure 3:
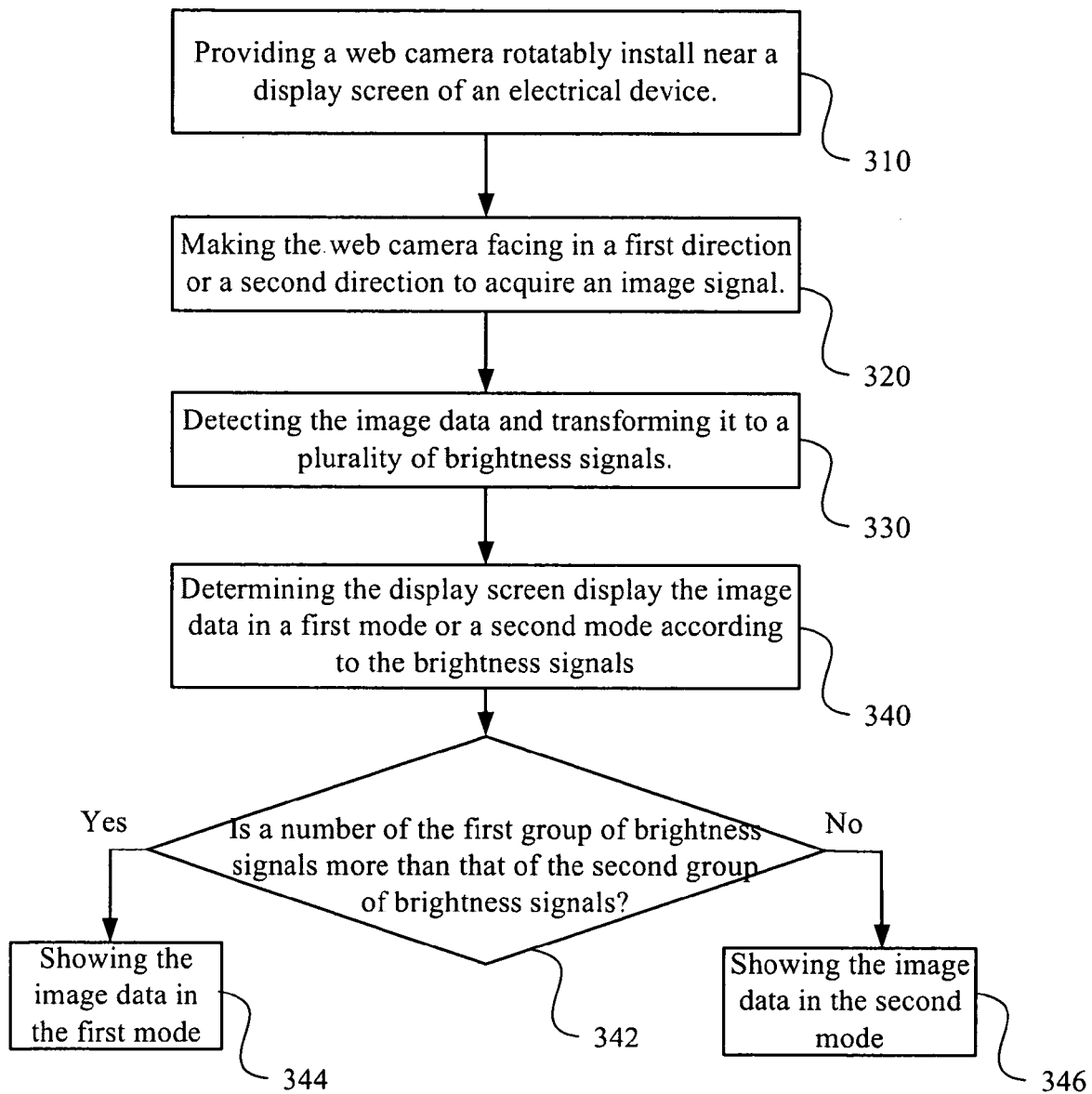
FIG. 3 is a flowchart of a method of adjusting a display image of an electrical device based on a rotation of a web camera according to a preferred embodiment of the present invention.

Please refer to FIG. 3. FIG. 3 is a flowchart of a method of adjusting a display image of an electrical device based on a rotation of a web camera according to a preferred embodiment of the present invention. As shown in FIG. 3, the method comprises steps of:

Step 310: Providing a web camera rotatably installed on a display screen of an electrical device.
Step 320: Making the web camera facing in a first direction or a second direction to acquire a plurality of image data.
Step 330: Detecting and transforming the image data to a plurality of brightness signals.
Step 340: Determining the display screen display the image data in a first mode or a second mode according to the brightness signals.
Step 342: Determining whether a number of the first group of brightness signals is more than that of the second group of brightness signals.
Step 344: Showing the image data in the first mode.
Step 346: Showing the image data in the second mode.

Compared to the prior art, the electrical device of the invention adjusts the direction of display image according to brightness of the image data obtained by the web camera. The processing unit composed of software program codes determines the direction of the web camera's shot in terms of brightness distribution of the image data and accordingly, determines whether to adjust the display image or not. By the processing unit, the function of the prior art can be exercised without any additional tenon, which saves extra cost.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention.

What is claimed is:

1. An electrical device of adjusting a display image based on ambient illumination detected by a web camera comprising:
   a display screen for showing an image;
   a frame surrounding the display screen;
   a web camera rotatably installed on one side of the frame for capturing an image data in a first direction and a second direction inversed to the first direction by 180 degrees;
   an image sensor coupled to the web camera, for generating a plurality of brightness signals based on the image data; and
   a processing unit coupled to the image sensor, for determining the display screen to show the image data in a first mode or a second mode based on the plurality of brightness signals.

2. The electrical device of claim 1, wherein the processing unit determines the display screen to show the image data in the first mode when the web camera is facing to the first direction.

3. The electrical device of claim 2, wherein the processing unit determines the display screen to show the image data in the second mode when the web camera is facing to the second direction.

4. The electrical device of claim 1, being a notebook computer.

5. The electrical device of claim 1, wherein the processing unit is used for determining the display screen to show the image data in the first mode or the second mode based on a number of brightness signals in excess of a predetermined value.

6. The electrical device of claim 1, wherein the plurality of brightness signals further comprising a first group of brightness signals and a second group of brightness signals.

7. The electrical device of claim 6, wherein the display screen shows the image data in the first mode, when a number of the first group of brightness signals is more than that of the second group of brightness signals.

8. The electrical device of claim 7, wherein the display screen shows the image data in the second mode, when a number of the first group of brightness signals is less than that of the second group of brightness signals.

9. A method of adjusting a display image of an electrical device, the electrical device comprising a display screen surrounded by a frame, the method comprising:
   providing a web camera rotatably installed on one side of frame;
   capturing an image data when the web camera is facing to in a first direction and a second direction inversed to the first direction by 180 degrees;
   generating a plurality of brightness signals based on the image data; and
   determining the display screen to show the image data in a first mode or a second mode based on the plurality of brightness signals.

10. The method of claim 9, wherein the display screen shows the image data in the first mode when the web camera is facing to the first direction.

11. The method of claim 10, wherein the display screen shows the image data in the second mode when the web camera is facing to the second direction.

12. The method of claim 9, further comprising: determining the display screen to show the image data in the first mode or the second mode based on a number of brightness signals in excess of a predetermined value.

13. The method of claim 9, wherein the plurality of brightness signals further comprising a first group of brightness signals and a second group of brightness signals.

14. The method of claim 13, wherein the display screen shows the image data in the first mode, when a number of the first group of brightness signals is more than that of the second group of brightness signals.

15. The method of claim 14, wherein the display screen shows the image data in the second mode, when a number of the first group of brightness signals is less than that of the second group of brightness signals.

* * * * *